(12) United States Patent
Kobayashi

(10) Patent No.: US 8,337,347 B2
(45) Date of Patent: Dec. 25, 2012

(54) DRIVING BELT, AND DEVICE AND METHOD FOR ASSEMBLING SAME

(75) Inventor: Daisuke Kobayashi, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 443 days.

(21) Appl. No.: 12/439,014

(22) PCT Filed: Aug. 22, 2007

(86) PCT No.: PCT/JP2007/066710
§ 371 (c)(1),
(2), (4) Date: Feb. 26, 2009

(87) PCT Pub. No.: WO2008/026615
PCT Pub. Date: Mar. 6, 2008

(65) Prior Publication Data
US 2010/0016113 A1      Jan. 21, 2010

(30) Foreign Application Priority Data

Aug. 28, 2006  (JP) ................................ 2006-231271

(51) Int. Cl.
*F16G 5/16* (2006.01)
(52) U.S. Cl. ...................................... 474/201; 474/242
(58) Field of Classification Search .................. 474/201, 474/237, 240, 242, 244, 245, 246
See application file for complete search history.

(56) References Cited

U.S. PATENT DOCUMENTS

| 3,949,621 | A |   | 4/1976 | Beusink et al. |
|-----------|---|---|--------|----------------|
| 4,501,578 | A | * | 2/1985 | Schneider ...................... 474/201 |
| 4,645,478 | A |   | 2/1987 | Cuypers |
| 5,047,937 | A |   | 9/1991 | Vahabzadeh et al. |
| 6,679,798 | B1 | * | 1/2004 | Takagi et al. .................. 474/242 |

(Continued)

FOREIGN PATENT DOCUMENTS

EP          0 151 396 B1    10/1986

(Continued)

OTHER PUBLICATIONS

Extended Search Report issued Dec. 3, 2010 in EP Application No. 07806187.6.

*Primary Examiner* — William E Dondero
(74) *Attorney, Agent, or Firm* — Oblon, Spivak, McClelland, Maier & Neustadt, L.L.P.

(57) ABSTRACT

A method and device of assembling a driving belt, which can fit a ring into a recess of an element easily, and which can prevent the ring from being damaged when fitting the ring into the recess of the element. A driving belt, in which two rows of endless rings are accommodated parallel to each other in a recess of a plurality of elements interlinked annularly in a manner to situate the recess to open to an outer circumferential side, includes a guide face, which is formed on an end face of a protruding portion for holding the ring to prevent detachment of the ring from the recess. The guide face produces an inward component of a pushing force pushing one of the rings to one of the end faces, and the produced inward component of pushing force is applied to an outer lateral side of the pushed ring.

10 Claims, 11 Drawing Sheets

U.S. PATENT DOCUMENTS

| | | | |
|---|---|---|---|
| 6,684,473 | B1 | 2/2004 | Yamagishi et al. |
| 2002/0088115 | A1 | 7/2002 | Herring |
| 2007/0072721 | A1 | 3/2007 | Takagi et al. |

FOREIGN PATENT DOCUMENTS

| | | |
|---|---|---|
| EP | 1 662 174 A1 | 5/2006 |
| JP | 58 9546 | 1/1983 |
| JP | 58 9547 | 1/1983 |
| JP | 59 22344 | 2/1984 |
| JP | 60 69346 | 4/1985 |
| JP | 63 190953 | 8/1988 |
| JP | 10 159910 | 6/1998 |
| JP | 2000 205344 | 7/2000 |
| JP | 2000 249195 | 9/2000 |
| JP | 2001 138149 | 5/2001 |
| JP | 2001 193796 | 7/2001 |
| JP | 2002 195350 | 7/2002 |
| JP | 2002-276740 | 9/2002 |
| SU | 359456 | 12/1972 |
| SU | 745379 | 6/1980 |
| SU | 1459614 A3 | 2/1989 |

* cited by examiner

DRIVING BELT, AND DEVICE AND METHOD FOR ASSEMBLING SAME

TECHNICAL FIELD

This invention relates to a driving belt, in which a plurality of plate elements interlinked with one another in a circular manner is fastened by an endless annular ring, and to an assembling device and method thereof.

BACKGROUND ART

In the prior art, a geared transmission capable of changing a gear stage thereof stepwise, and a continuously variable transmission capable of varying a speed change ratio steplessly are available as a transmission mechanism for transmitting power between rotary members. For example, a belt-type continuously variable transmission and a toroidal-type continuously variable transmission are known as the continuously variable transmission. Specifically, the belt-type continuously variable transmission is a transmission varying a speed change ratio continuously using a pair of drive pulleys and a pair of driven pulleys, and a driving belt applied to those pulleys. The known endless driving belt used in such belt-type continuously variable transmission is prepared by arranging a plurality of plate members called an "element" or a "block" in a circular manner while connecting the plate members with one another, and fastening the interlinked plate members by an annular belt called a "band" or a "carrier".

When the driving belt of this kind applied to the drive and driven pulleys is driven by driving the drive pulley, a frictional force acts on a contact portion between the element and the drive pulley, and a compressive force is applied to the elements in the arranging direction thereof, i.e., in the thickness direction thereof according to a torque of the drive pulley. The compressive force applied to the element being contacted with the drive pulley is transmitted to the element being contacted with the driven pulley via the elements existing between the drive and driven pulleys. When the compressive force is transmitted to the element being contacted with the driven pulley, a frictional force is generated at the contact portion between the element and the driven pulley, and a torque to rotate the driven pulley is established according to the transmitted compressive force. The power is thus transmitted between the drive and driven pulley through the driving belt.

One example of above-explained driving belt is disclosed in Japanese Patent Laid-Open No. 2000-249195. The "High-Loaded Transmission Belt" taught by Japanese Patent Laid-Open No. 2000-249195 is composed of a center belt and blocks reinforced against lateral pressure, and it is applied to a main prime mover and an auxiliary prime mover of automobiles and agricultural machineries. Specifically, the "High-Loaded Transmission Belt" comprises a block (i.e., an element) which is so constituted that two belt sides having lock parts in its top end are connected to each other in their bottom ends by a connecting member, and two rows of endless carriers (i.e., rings) fixedly fitted into an engagement groove opening between the lock parts. The belt side portion of the element is provided individually with a convex portion and a concave portion on each face so that the elements can interlink with one another. Therefore, the interlinked elements can be aligned even when the belt is running.

In addition to above, Japanese Patent Laid-Open No. 2001-193796 discloses an invention relating to "Element for Metal Belt and Metal Belt" for continuously variable transmissions of vehicles. The metal belt taught by Japanese Patent Laid-Open No. 2001-193796 comprises: a metal endless band (i.e., a ring) applied to annular grooves of a drive and a driven pulleys; a plurality of metal element composed of a body portion to be contacted with the annular groove of the pulley, a pair of pillars erected on the body portion and faced with each other, an engagement protruded portion formed on a leading end of the pillar, and an opening for inserting the band (i.e., a recessed portion) formed between the engagement protruded portions; and an endless metal falling preventing body somewhat wider than the band. The falling preventing body can be bent to narrow its width when it is inserted in between the engagement protruded portions to prevent falling of the band.

According to the transmission belt taught by Japanese Patent Laid-Open No. 2000-249195, the lock parts are formed on both belt sides of the element erected beside the carriers to hold the carriers on the element, and the convex portion and the concave portion are formed individually on an upper corner of each face of the belt sides to interlink adjoining elements. That is, the convex portion and concave portion functioning as male and female connections are formed symmetrically on both upper corner of the element. The carriers are individually fitted into each engagement groove and held by the lock part so that two rows of the belts are held in the element.

According to the transmission belt of Japanese Patent Laid-Open No. 2000-249195 thus structured, the carriers arranged parallel to each other have to be overlapped partially when fitted onto the elements or dismounted from the elements. That is, a total width of the carriers arranged parallel to each other have to be reduced narrower than the opening width between the lock parts of the element when the carriers are fitted onto the elements or dismounted from the elements, by twisting the carriers to overlap partially.

In order to twist the carriers being arranged parallel to each other thereby overlapping those carriers partially, it is necessary to swing the interlinked elements, that is, to pivot the elements relatively with each other. However, according to the transmission belt taught by Japanese Patent Laid-Open No. 2000-249195, the convex portion and the concave portion for interlinking adjoining elements are formed on both upper corners of the element. Accordingly, lateral movement of the element has to be restricted. This makes difficult to overlap the carriers arranged parallel to each other when assembling the transmission belt.

In order to solve the above-mentioned problem, the applicant has filed an application relating to the driving belt, in which a male connection and a female connection for joining adjoining elements are individually formed on each face of the element being opposed to the adjoining element, at a width center of the element. Therefore, the two rows of rings aligned parallel to each other can be overlapped easily by a pivotal movement of the elements to be fitted into a recess of the element.

However, as shown in the accompanying FIG. 14, an end face Eb of a latch portion Ea of an element E and an outer lateral face Ra of a ring R interfere with each other when fitting the overlapped rings into the recess of the element E and aligning the ring parallel to each other in the recess. Thus, a difficulty in fitting the ring R into the recess of the element E still remains and an easiness of assembly of the driving belt is thereby deteriorated. In addition, an outer circumferential face Rb of the ring R may be damaged by an inner edge Ec of the latch portion Ea of the element E when fitted into the recess of the element E. As a result, a durability of the ring, that is, a durability of the driving belt may be deteriorated.

DISCLOSURE OF THE INVENTION

The present invention has been conceived noting the technical problems thus far described, and its object is to provide a driving belt, and a device and a method for assembling same, which can fit a ring into a recess of an element easily while preventing a damage of the ring.

In order to achieve the above-mentioned object, according to the present invention, there is provided a driving belt, in which a plurality of elements is interlinked annularly in a manner to situate a recess thereof to open to an outer circumferential side, and in which two rows of endless rings are accommodated parallel to each other in the recess of the element, comprising: protruding portions for holding the rings to prevent detachment of the rings from the recess, which protrude from an outer circumferential side of inner walls of the recess toward a width center of the element to reduce maximum clearance between end faces thereof narrower than a total width of the rings; and a guide face for producing an inward component of a pushing force pushing one of the rings thereto, which is formed on at least one of the end faces of the protruding portions.

The clearance between the guide face and the end face of other protruding portion become wider continuously toward an inner circumferential side.

More specifically, the guide face is an inclined face formed on the end face of the protruding portion.

In addition to above, the element comprises a male connection protruding toward an adjoining element on one of the faces thereof being opposed to the adjoining element, and a female connection into which the male connection is fitted loosely on a face opposite to the face where the male connection is formed. That is, each of the elements is interlinked pivotally with both of the adjoining elements through the male and female connections.

According to the invention, the male connection and the female connection are respectively formed at one spot of the face where the male connection and the female connection are respectively formed.

Specifically, the male and female connections are respectively formed on a width center of the face where the male and female connections are respectively formed.

In addition to above, each of the rings comprises an outer layer, which is laid on an outer face thereof in the recess, and which is disposed between the protruding portions.

According to another aspect of the invention, there is provided an assembling device of a driving belt, in which a plurality of elements is interlinked annularly in a manner to situate a recess thereof to open to an outer circumferential side, and in which two rows of endless rings are accommodated parallel to each other in the recess of the element and held by protruding portions formed on an opening end side of inner walls of the recess to prevent detachment of the rings, comprising: a guide means for guiding the ring to an inner circumferential side of the protruding portion when fitting the rings into the recess.

The guide means includes a means for producing a circumferential inward component of a pushing force when one of the rings is pushed close toward one of the protruding portion along a width direction and a lateral side of the pushed ring is contacted thereto.

More specifically, the guide means comprises a contacting face to which a lateral side of the pushed ring is contacted. The contacting face is formed such that a distance between the contacting face and an end face of the protruding portion facing toward a width center is getting shorter according as a direction from the outer circumferential side to the inner circumferential side.

In addition to above, the contacting face is an inclined flat face to which the lateral side of the pushed ring is slidably contacted.

According to still another aspect of the invention, there is provided an assembling method of a driving belt, in which a plurality of elements is interlinked annularly in a manner to situate a recess thereof to open to an outer circumferential side, and in which two rows of endless rings are accommodated parallel to each other in the recess of the element and held by protruding portions formed on an opening end side of inner walls of the recess to prevent detachment of the rings, comprising: overlapping the two rows of rings; fitting an outer lateral side of an inwardly overlapped ring into an inner circumferential side of one of the protruding portion in the recess; and thereafter fitting an outwardly overlapped ring into the inner circumferential side of other protruding portion in the recess, by pushing the outwardly overlapped ring toward the other protruding portion while applying an inward component of a pushing force to an outer lateral side of the pushed ring.

In addition to above, the assembling method of a driving belt of the invention is characterized in that the inward component of the pushing force pushing the outwardly overlapped ring is applied to the outer lateral side of the pushed ring, by using the element comprising a guide face on an end face of at least one of the protruding portions so that a clearance between the guide face and an end face of other protruding portion becomes wider from an outer circumferential side to an inner circumferential side.

More specifically, the guide face is an inclined flat face to which the outer lateral side of the pushed ring is slidably contacted.

In addition to above, the assembling method of a driving belt of the invention is characterized in that the inward component of the pushing force pushing the outwardly overlapped ring is applied to the outer lateral side of the pushed ring to guide the pushed ring to an inner circumferential side of the protruding portion in the recess, by using an assembling device comprising a guide means having a contacting face formed such that a distance to an end face of the protruding portion facing toward a width center is getting shorter according as a direction from the outer circumferential side to the inner circumferential side.

More specifically, the contacting face is an inclined flat face to which the outer lateral side of the pushed ring is slidably contacted.

As explained above, according to the invention, the maximum clearance between the end faces of the protruding portions protruding from the outer circumferential side of the inner walls of the recess is narrower than the total width of the two rows of rings. Therefore, the two rows of rings accommodated in the recess of the element can be held certainly between a bottom face of the recess and an inner face of the protruding portion, and detachment of the rings from the element is thereby prevented. Additionally, at least one of the protruding portions comprises a guide face on the end face thereof. The guide face assists the ring being pushed to be fitted into the recess of the element by applying an inward component of the pushing force to the lateral side of the pushed ring. Therefore, the ring can be fitted into the recess of the element easily an smoothly. As a result, easiness of assembly of the driving belt is improved. Moreover, since the ring is fitted into the recess of the element smoothly, a surface of the ring can be prevented from being damaged by an edge of the element. As a result, deterioration of durability of the ring can be prevented.

Specifically, the distance between the guide face formed on the end face of one of the protruding portion and the opposed end face of other protruding portion is widen continuously from the outer circumferential side to the inner circumferential side. For this reason, interference between the protruding portion of the element and the lateral side of the ring being fitted into the recess of the element can be prevented, and the surface of the ring is thereby prevented from being damaged by the edge of the protruding portion.

More specifically, the guide face formed on the end face of one of the protruding portion is an inclined flat face for assisting the ring to be fitted into the recess of the element, and the distance between the guide face and the opposed end face of other protruding portion is widen continuously from the outer circumferential side to the inner circumferential side. For this reason, interference between the protruding portion of the element and the lateral side of the ring being fitted into the recess can be prevented effectively, and the surface of the ring is thereby prevented from being damaged by the edge of the protruding portion.

In addition to the above advantage, as explained above, the male and female connections are formed individually on each face of the element being opposed to an adjoining element, and the elements are interlinked pivotally with each other by joining the male and female connections while keeping a predetermined clearance. Therefore, the elements interlinked in a circular manner can be positioned accurately, and the elements can pivot relatively with each other.

Specifically, the male and female connections are respectively formed at one spot of the face where the male connection and female connections are respectively formed. Therefore, the elements being interlinked in a circular manner can be positioned accurately, and the elements can pivot easily around the connected male and female connections.

More specifically, both of the male connection and female connection formed respectively on each face of the element being opposed to the adjoining element are situated on a substantially intermediate portion of the element in the width direction. Therefore, the elements interlinked in a circular manner can be positioned accurately, and the each element is allowed to pivot equally in the width direction thereof around the joined male and female connections situated on the width center thereof.

In addition to the above advantage, according to the invention, an outer layer can be formed between the protruding portions on the outer face of each ring accommodated in the recess of the element. Therefore, a thickness of the ring can be increased to enhance the strength of the driving belt while utilizing the space between the protruding portions efficiently.

According to another aspect of the invention, the ring is guided by the guide means when fitted into the recess of the element. Therefore, the ring can be fitted into the recess of the element smoothly and easily, and easiness of assembly of the driving belt is thereby improved. Moreover, the surface of the ring can be prevented from being damaged by an edge of the element. As a result, deterioration of durability of the ring can be prevented.

In addition to the above advantage, according to the invention, when one of the rings is pushed toward one of the protruding portions to be fitted into the recess of the element, the guide means assists the pushed ring to be fitted into the recess while applying an inward component of the pushing force to the lateral side of the pushed ring. For this reason, interference between the protruding portion of the element and the outer lateral side of the ring being fitted into the recess can be prevented, and the surface of the ring is thereby prevented from being damaged by the edge of the protruding portion.

Specifically, the guide means comprises the contacting face to which the outer lateral side of the ring to be fitted into the recess of the element is contacted. As explained above, the distance between the contracting face and the end face of the protruding portion to which the ring is pushed to be fitted into the recess is getting shorter from the outer circumferential side to the inner circumferential side. For this reason, interference between the protruding portion of the element and the outer lateral side of the ring being fitted into the recess can be prevented, and the surface of the ring is thereby prevented from being damaged by the edge of the protruding portion.

More specifically, the contacting face of the guide means is an inclined flat face. That is, the distance between the inclined flat face and the end face of the protruding portion to which the ring is pushed to be fitted into the recess is getting shorter from the outer circumferential side to the inner circumferential side. For this reason, interference between the protruding portion of the element and the outer lateral side of the ring being fitted into the recess can be prevented, and the surface of the ring is thereby prevented from being damaged by the edge of the protruding portion.

According to still another aspect of the invention, the two rows of rings aligned parallel to each other are overlapped when fitted into the recess of the element. As a result, the total width of the rings is reduced so that the rings can be fitted into the recess easily from the overlapped portion through the opening of the recess. The outer lateral side of an inwardly overlapped ring is fitted into the inner circumferential side of one of the protruding portion in the recess, and then, a pushing force for pushing the outwardly overlapped ring toward the inner circumferential side of other protruding portion is applied to the outwardly overlapped ring. In this situation, an inward component of pushing force is applied to the outer lateral side of the outwardly overlapped ring being pushed. As a result, the outwardly overlapped ring is fitted into the space of inner circumferential side of the other protruding portion in the recess, and the rings are aligned parallel to each other again. Thus, the rings can be fitted into the recess of the element easily, and easiness of assembly of the driving belt is thereby improved. Also, the surface of the ring is prevented from being damaged by the edge of the protruding portion so that deterioration of durability of the driving belt can be prevented.

As explained above, the element comprising the guide face for guiding the ring to be fitted into the recess of the element is used in the assembling method of the invention. The distance between the guide face formed on the end face of one of the protruding portion and the opposed end face of other protruding portion is widen continuously from the outer circumferential side to the inner circumferential side. For this reason, interference between the protruding portion of the element and the outer lateral side of the ring being fitted into the recess can be prevented, and the surface of the ring is thereby prevented from being damaged by the edge of the protruding portion.

Specifically, the guide face is an inclined face, and the distance between the inclined face and the opposed end face of other protruding portion is widen continuously from the outer circumferential side to the inner circumferential side. For this reason, interference between the protruding portion of the element and the outer lateral side of the ring being fitted into the recess can be prevented effectively, and the surface of the ring is thereby prevented from being damaged by the edge of the protruding portion.

Alternatively, according to the assembling method of the invention, assembling device comprising the guide means having a contacting face can also be used. The outer lateral side of the ring being pushed to be fitted into the recess of the element is contacted to the contacting face of the guide means, and an inward component of the pushing force pushing the ring is applied to the outer lateral side of the pushed ring by the contacting face of the guide means. As a result, interference between the protruding portion of the element and the outer lateral side of the ring being fitted into the recess can be prevented, and the surface of the ring is thereby prevented from being damaged by the edge of the protruding portion.

More specifically, the contacting face of the guide means is an inclined flat face inclined to get closer to the end face of the protruding portion to which the ring is pushed to be fitted into the recess from the outer circumferential side to the inner circumferential side. Therefore, interference between the protruding portion of the element and the outer lateral side of the ring being fitted into the recess can be prevented, and the surface of the ring is thereby prevented from being damaged by the edge of the protruding portion.

BEST MODE FOR CARRYING OUT THE INVENTION

Next, this invention will be explained with reference to the accompanying drawings. First of all, examples of the driving belt and assembling device thereof according to the invention will be explained sequentially, and then, an assembling method of the driving belt of the invention will be explained.

First Example

Figure 1:
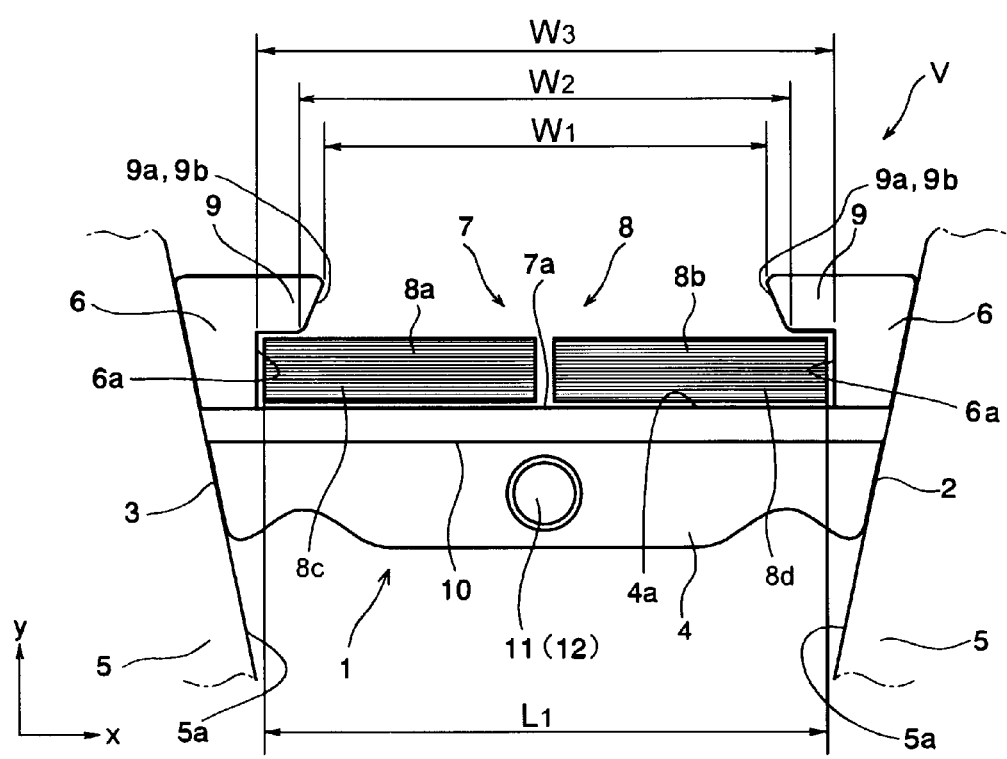
FIG. 1 is a front view schematically showing a configuration of the first element used in a first example of the driving belt of the invention.

Here will be explained configurations of an element and a ring constituting a driving belt of the first example with reference to FIGS. 1 and 2. FIG. 1 shows an example of a driving belt V to be applied to a drive pulley (i.e., an input shaft side pulley) and a driven pulley (i.e., an output shaft side pulley) of a belt type continuously variable transmission so as to transmit a power between those pulleys. An element 1 is a metal plate member comprising a base portion (or main body) 4. Both lateral faces 2 and 3 of the base portion 4, that is, both lateral ends (in the direction of x-axis in FIG. 1) of the base portion 4 are inclined. The inclined lateral faces 2 and 3 are frictionally contacted with a V-shaped groove 5a of a drive or driven pulley 5 of the belt type continuously variable transmission to transmit a torque.

The base portion 4 comprises columns 6 erected vertically (in the direction of y-axis in FIGS. 1 and 2) at both lateral ends (in the direction of x-axis in FIG. 1) thereof. Accordingly, a recess 7 is formed by an upper face (or a top edge) 4a of the base portion 4 and both inner walls 6a of the columns 6 facing to the center of the base portion 4. Thus, the recess 7 opens upwardly, in other words, the recess 7 opens toward an outer circumference of the driving belt V.

Specifically, the recess 7 is a space for accommodating an endless ring 8 for fastening the elements 1 interlinked closely with one another in a circular manner. That is, the upper face 4a functions as a saddle face 4a onto which an inner circumferential face of the ring 8 is fitted.

The ring 8 is a layered ring made of metal comprising a plurality of annular belt-like layers overlapped in a circumferential direction. According to the first example, two rings 8a and 8b are arranged parallel to each other in the recess 7. Here, a configuration, dimensions, material, strength and so on of the rings 8a and 8b are identical to each other:

The element 1 comprises protruding portions 9. Each protruding portion 9 is formed integrally with the column 6 and protrudes toward a width center of the base portion 4 from an outer circumferential side of the columns 6, that is, both end faces 9a of the protruding portions 9 are faced inwardly to be opposed to each other. In other words, the protruding portion 9 is formed on both opening ends of the recess 7 above lateral ends of the ring 8a and 8b, i.e., on the end portions of the inner walls 6a, and both of the protruding portions 9 protrude toward a width center of the recess 7 (i.e., in the direction of x-axis in FIG. 1).

A guide face 9b is formed on both end faces 9a, and both of the guide faces 9b are inclined. Accordingly, a clearance between the end faces 9a is widened continuously from an outer circumferential side to an inner circumferential side, in other words, from upper side to lower side in the direction of y-axis in FIG. 1. In this example, although the guide faces 9b are formed on both end faces 9a symmetrically with respect to the width center of the element 1, one of the guide faces may be omitted. Alternatively, each guide face may be formed into different configuration.

Therefore, as shown in FIG. 1, a distance between the end faces 9a becomes narrowest at the circumferentially outermost portion of the end faces 9a. That is, such narrowest clearance between the end faces 9a is an opening width W1 of the recess 7. On the other hand, the distance between the end faces 9a becomes widest at the circumferentially innermost portion of the end faces 9a. That is, such widest clearance between the end faces 9a is a maximum opening width W2 of the recess 7. Additionally, a width of the recess 7 at bottom portion 7a side (i.e., the upper face 4a), a distance between the inner walls 6a is wider than the opening width W1, and such distance between the inner wills 6a is represented by W3 in FIG. 1.

The elements 1 are interlinked with one another in a circular manner and fastened by the ring 8. The elements 1 thus fastened by the ring 8 is applied to the drive and driven pulleys 5. In case the driving belt V is applied to the pulleys 5, clearances between the elements 1 are narrowed gradually toward a rotational center of the pulleys 5 in a region where the elements 1 are contacted with the pulleys 5, and the elements 1 are eventually contacted with one another at its portion close to the rotational center of the pulley 5. For this reason, a thickness of the element 1 has to be thinned at its lower portion, that is, at the portion close to the rotational center of the pulley 5, as illustrated in FIG. 2.

Figure 2:
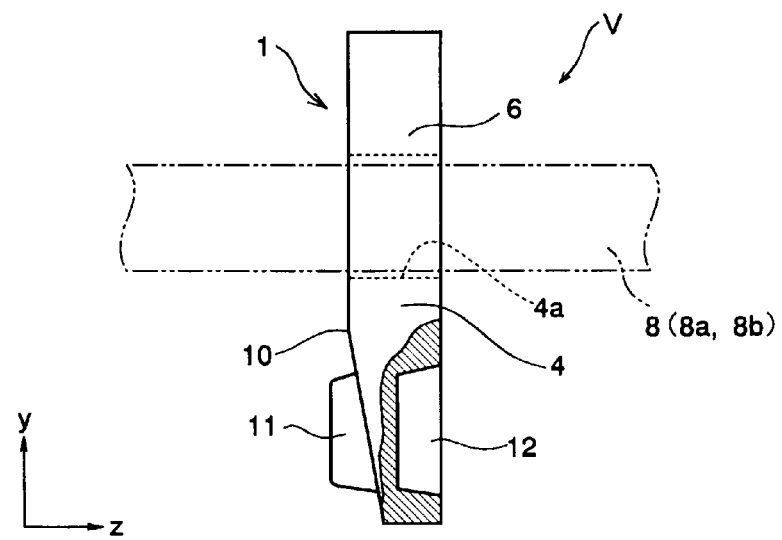
FIG. 2 is a side sectional view schematically showing a section of the driving belt of the first example.

According to the example shown in FIG. 2, one of the faces of the base portion 4 i.e., the left face in FIG. 2 is thinned gradually from a predetermined portion below the saddle face 4a. In case the belt V is being applied to the pulleys 5, the elements 1 are contacted with the adjoining element 1 at the portion where the thickness thereof starts to be reduced, in the region where the elements 1 are contacted with the pulley 5, in other words, in a curving region of the belt V. That is, an edge of a boundary of thickness functions as a rocking edge 10.

A male connection 11 and a female connection 12 are respectively formed on each face of the base portion 4 being opposed to the adjoining element 1, at the center of width of the element 1. Specifically, as shown in FIG. 2, the male connection 11 of circular truncated cone is formed on one of the faces of the base portion 4 where the rocking edge 10 is formed. On the other hand, the bottomed cylindrical female connection 12 to which the adjoining male connection 11 is inserted loosely is formed on a face opposite to the face on which the male connection 11 is formed. Therefore, the elements 1 can be kept in line within a straight region of the belt V where the element 1 is not being contacted with the pulley 5.

That is, a relative position of the elements 1 within the straight region of the driving belt V can be determined in both vertical and horizontal directions in FIG. 1 by joining the male and female connections 11 and 12. For this reason, chattering of the driving belt V is prevented so that the belt V can be driven smoothly when the belt-type continuously variable transmission is driven.

Figure 3:
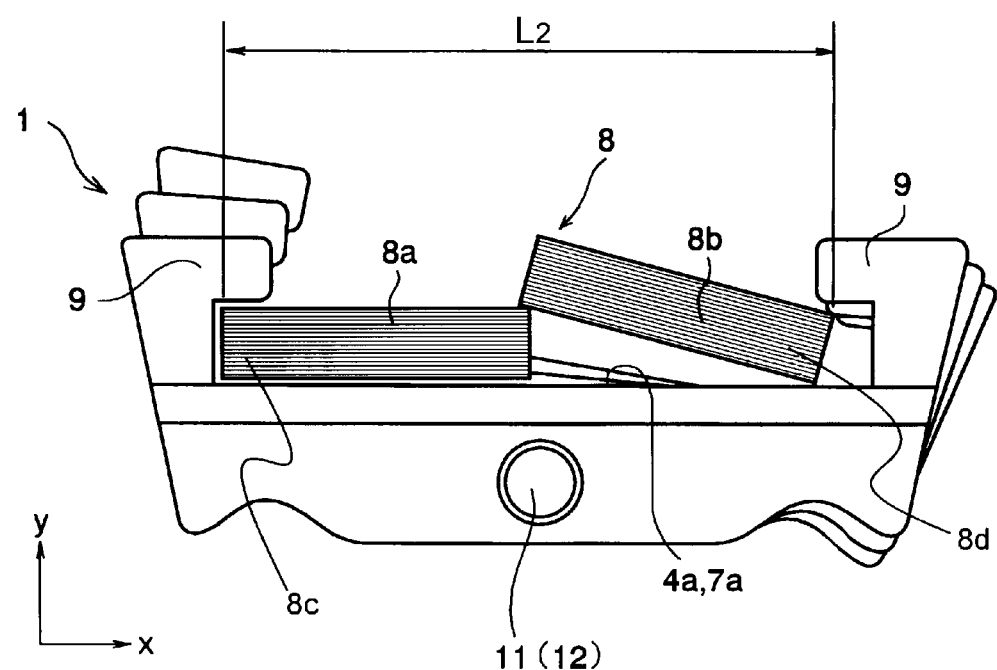
FIG. 3 is a view schematically showing a pivotal movement of the elements constituting the driving belt of the first example.

One male connection 11 and one female connection 12 are respectively formed on each face of the element 1 being opposed to the adjoining element 1, and those connections 11 and 12 are positioned at the width center of the element 1. Therefore, as shown in FIG. 3, the elements 1 interlinked in a circular manner by joining those male and female connections 11 and 12 can swing relatively with each other, in other words, can pivot relatively with each other.

Figure 4:
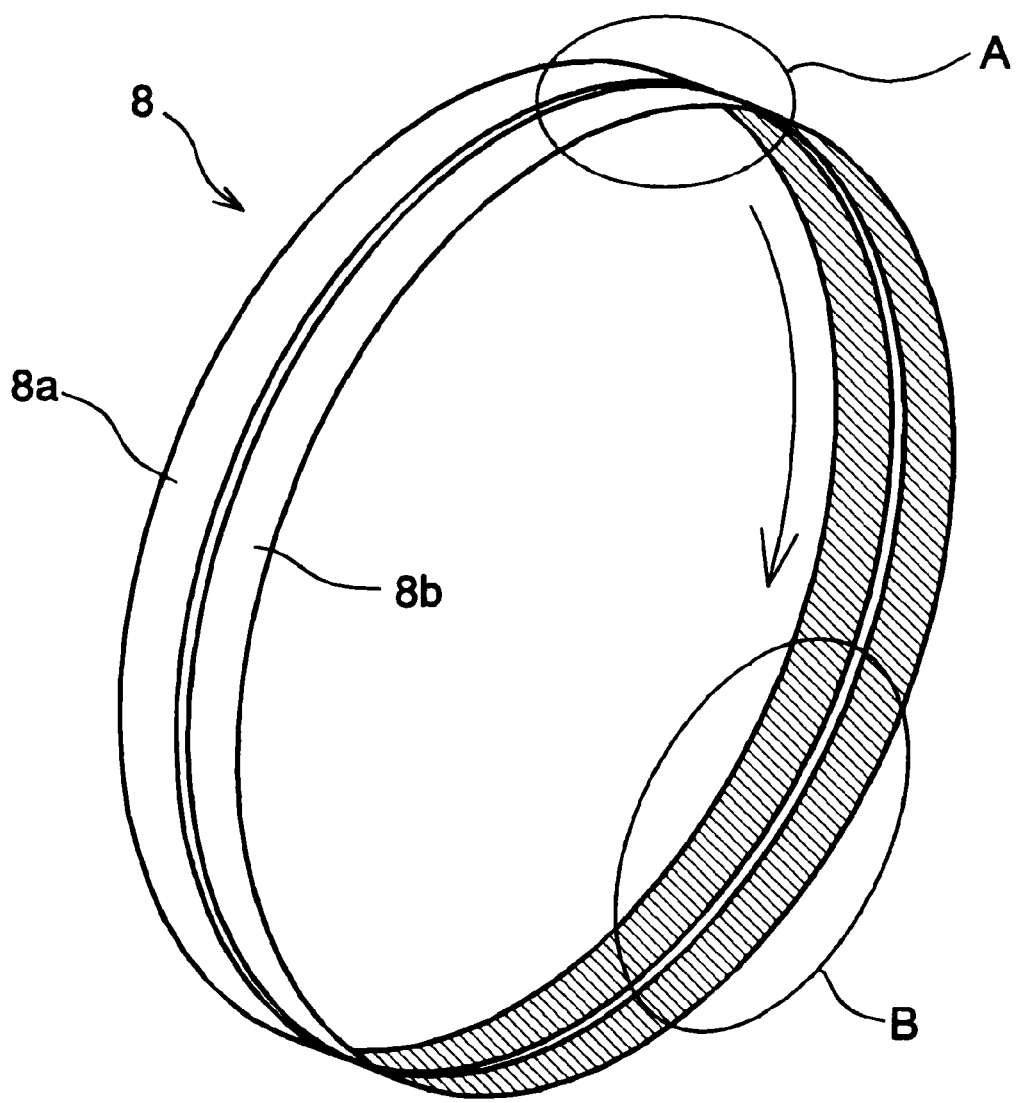
FIG. 4 is a view schematically showing an overlapped portion of the rings and a remaining portion of the rings aligned parallel to each other.

As mentioned above, the ring 8 comprises two rings 8a and 8b in this example. Therefore, as shown in FIG. 4, the rings 8a and 8b can be overlapped partially (as shown in a circle A in FIG. 4) while keeping the remaining portion of the rings 8a and 8b parallel to each other (as shown in a circle B in FIG. 4). Additionally, the rings 8a and 8b can be partially overlapped in its entire length by inwardly tucking the overlapped portion of the ring situated on the inner circumferential side.

According to the conventional driving belt, high degree of freedom of rings aligned parallel to each other is still ensured at an initial stage in which a number of elements holding those rings is relatively small so that those rings can be twisted easily to be overlapped partially. However, as the number of the element holding those rings increases, for example, at a stage in which more than half round of the rings are held by the elements, a twisting movement of the rings has to be restricted. On the other hand, according to the invention, the elements 1 of the driving belt V are interlinked to the adjoining elements 1 in a circular manner being pivotable relative to each other. Therefore, the ring 8 can twisted easily to be overlapped partially by a pivotal movement of the element 1 even at a stage in which relatively large number of elements 1 are holding the rings 8a and 8b.

As shown in FIG. 1, a width L1 of the ring 8, i.e., a total width of the rings 8a and 8b aligned parallel to each other is wider than the aforementioned opening width W2 but narrower than the width W3. However, as indicated by L2 in FIG. 3, the total width of the ring 8 can be reduced partially to be fitted into the recess 7 by overlapping the rings 8a and 8b partially.

As described above, the inclined faces, i.e., the guide faces 9b are formed on the end faces 9a of the protruding portions 9, and the distance between the guide faces 9b is widened continuously from the outer circumferential side to the inner circumferential side. Therefore, the outer lateral sides 8c and 8d of the rings 8a and 8b can be fitted into the clearance between an inner face of the protruding portion 9 and the bottom portion 7a (or the saddle face 4a) easily.

Figure 5:
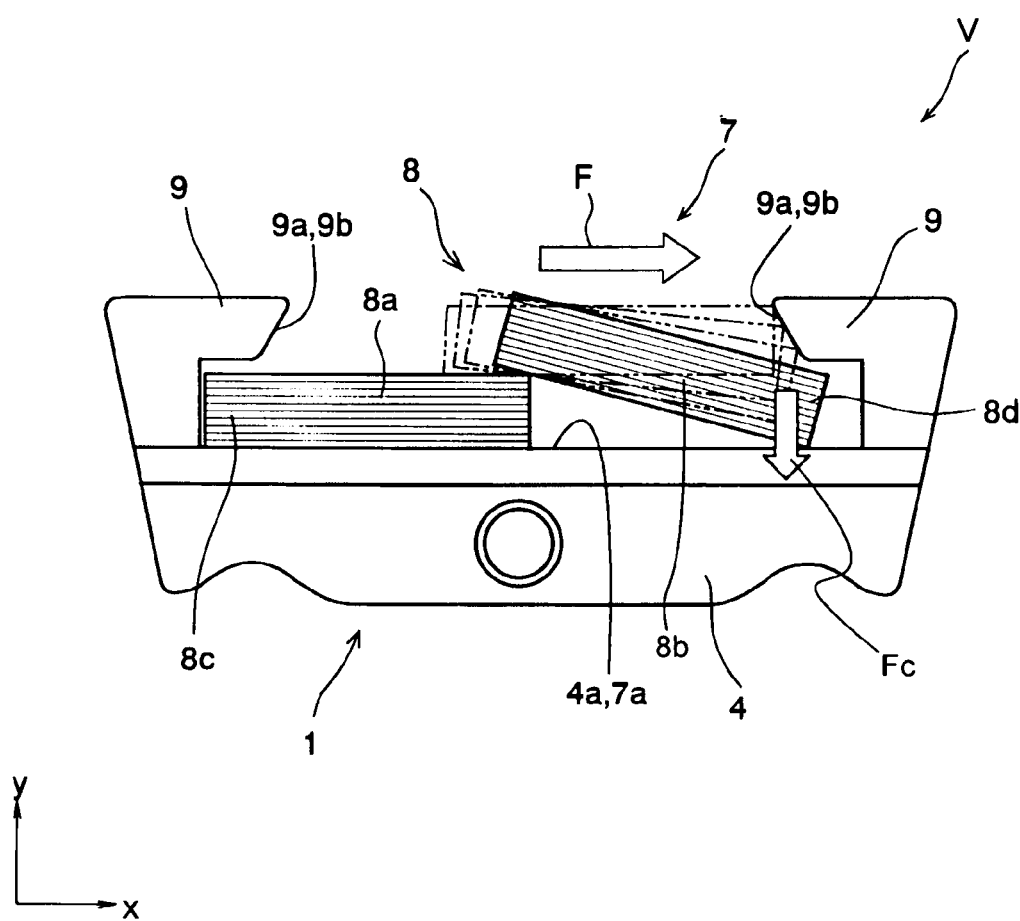
FIG. 5 is a view schematically showing a movement of the ring fitted into the recess of the element constituting the driving belt of the first example.

According to this example, the outer lateral side 8c of the ring 8a is fitted into the recess 7 of the element 1 first of all from the portion partially overlapped on an inner circumferential side of the ring 8b, as shown in FIG. 5. Then, a pushing force F is applied to the ring 8b partially overlapped on an outer circumferential side of the ring 8a, in a direction to press the outer lateral side 8d of the ring 8b against the guide face 9b, i.e., in the direction of x-axis in FIG. 5.

As explained above, the guide face 9b to which the outer lateral side 8d of the ring 8b is contacted is an inclined face. Therefore, in this situation, the guide face 9b functions to apply an inward component Fc of the pushing force F to the outer lateral side 8d of the ring 8b, in other words, to apply a downward component Fc of the pushing force F to the outer lateral side 8d of the ring 8b along the direction of y-axis in FIG. 5. As a result, the outer lateral side 8d of the ring 8b is allowed to slide on the guide face 9b from the outer circumferential side to the inner circumferential side. For this reason, the ring 8b partially overlapped on the outer circumferential side of the ring 8a can be fitted into the recess 7 of the element 1 easily while being guided by the guide face 9b.

Thus, the ring 8 can be fitted into the recess 7 of the element 1 smoothly and an easiness of assembly of the driving belt V is thereby improved. Moreover, since the ring 8 is thus fitted into the recess 7 of the element 1 smoothly, the surface of the ring 8 can be prevented from being damaged by an edge of the protruding portion 9 of the element 1. As a result, deterioration in durability of the driving belt V can be prevented.

Second Example

Here will be explained the second example of the element and the ring of the driving belt with reference to FIGS. 6 and 7. According to previously described first example, the width of both rings 8a and 8b constituting the ring 8 is entirely constant. On the other hand, according to this second example, the ring also comprises two rings but each ring comprises two layers of different widths. Specifically, the width of both inner rings is constant entirely, and a width of each outer ring is also constant entirely but narrower than that of the inner ring. The remaining elements of the second example are identical to those of the first example shown in FIGS. 1 and 2, so further explanation of the elements in common with those in the first example will be omitted by allotting common reference numerals.

Figure 6:
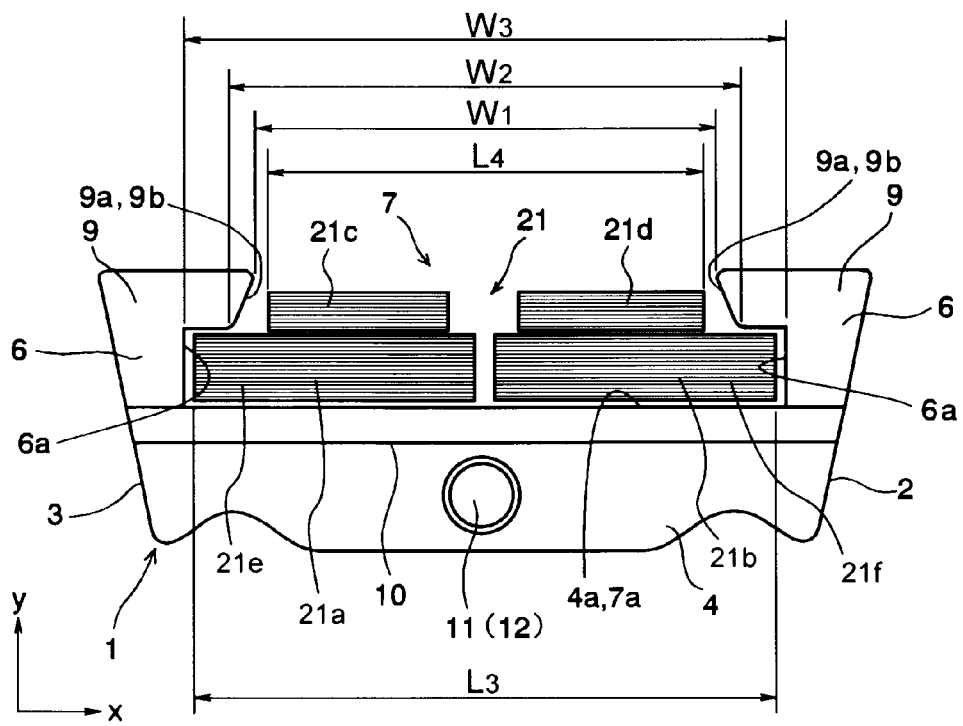
FIG. 6 is a front view schematically showing a second example of the driving belt of the invention.

In the example shown in FIG. 6, two lines of rings 21a and 21b are used to constitute a ring 21 instead of the rings 8a and 8b of the first example. As shown in FIG. 6, outer rings 21c and 21d are individually formed on the rings 21a and 21b, and widths of the outer rings 21c and 21d are narrower than those of the rings 21a and 21b.

Specifically, as the rings 8a and 8b of the first example, widths of the rings 21a and 21b are entirely constant, and those rings 21a and 21b are aligned parallel to each other. As described above, the outer rings 21c and 21d are individually formed on outer circumferential faces of the rings 21a and 21b, and a total width of the outer rings 21c and 21d is narrower than the clearance between the end faces 9a of the protruding portions 9.

More specifically, as shown in FIG. 6, a width L3 of the ring 21, that is, a total width of rings 21a and 21b aligned parallel to each other is wider than the opening widths W1 and W2 but narrower than the width W3. On the other hand, a width L4, i.e., a total width of the outer rings 21c and 21d is narrower than the opening width W1. In addition to above, the rings 21a and 21b are individually designed to have a width thereof which can make the total maximum width of the ring 21 narrower than the opening width W1 when overlapped partially to be fitted into the recess 7 of the element 1 easily.

Therefore, the ring 21 can be fitted into the recess 7 from the clearance between the end faces 9a by overlapping the rings 21a and 21b partially. Then, the element 1 is moved to the portion where the rings 21a and 21b are aligned parallel to each other. Consequently, outer lateral sides 21e and 21f of the rings 21a and 21b are accommodated individually in the clearances between the protruding portion 9 and the bottom portion 7a (or the saddle face 4a) so that the rings 21a and 21b can be held in the recess 7, and detachment of the ring 21 from the element 1 is thereby prevented. Alternatively, it is also possible to align the partially overlapped rings 21a and 21b parallel to each other again in the recess 7. As explained above, both of the end faces 9a, i.e., the guide faces 9b to which the outer lateral sides 21e and 21f are individually contacted are inclined to widen the clearance therebetween continuously from the outer circumferential side to the inner circumferential side. Therefore, the outer lateral sides 21e and 21f are guided into the recess 7 of the element 1 smoothly.

In addition to the above-mentioned advantage, according to the example shown in FIG. 6, strength of the ring 21 can be enhanced by forming the outer rings 21c and 21d individually on the rings 21a and 21b to increase a thickness of the ring 21 within the clearance between the end faces 9a, without degrading easiness of fitting the ring 21 into the recess 7 of the element 1.

For example, strength of the ring 8 of the driving belt V shown in FIG. 1 can be enhanced by forming additional outer rings 21c and 21d individually on the rings 8a and 8b utilizing the space between the end faces 9a efficiently. In addition, a torque capacity of the driving belt V can also be increased without changing the design of the element 1.

Figure 7:
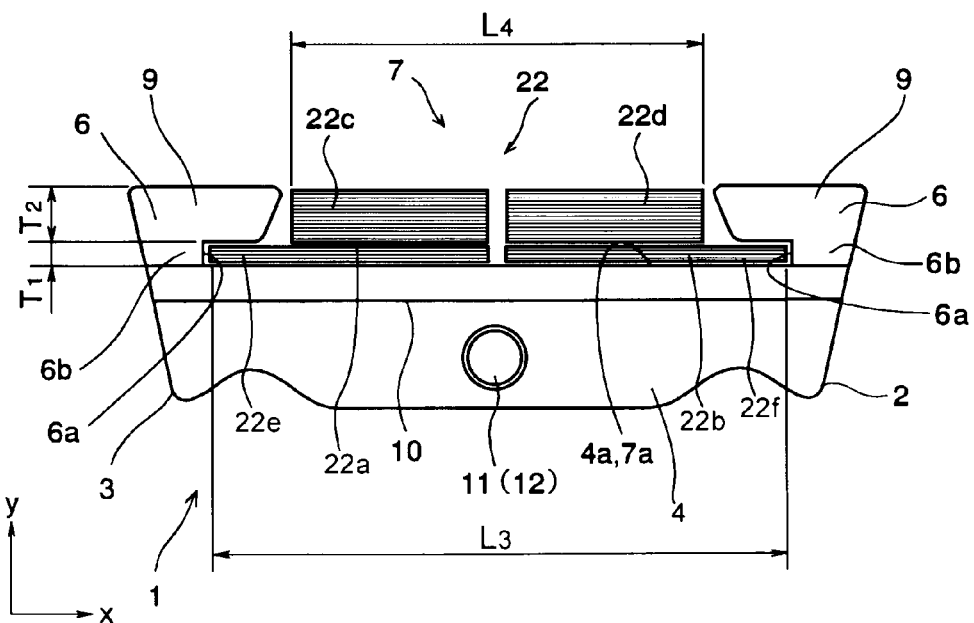
FIG. 7 is a front view schematically showing a modified example of the driving belt according to the second example.

FIG. 7 shows a modified example of the second example. As the ring 21 shown in FIG. 6, a ring 22 also comprises two lines of rings 22a and 22b, and outer rings 22c and 22d narrower than the rings 22a and 22b are formed individually on the rings 22a and 22b.

Specifically, widths of the rings 22a and 22b are entirely constant, and those rings 22a and 22b are aligned parallel to each other. As described above, the outer rings 22c and 22d are individually formed on outer circumferential faces of the rings 22a and 22b, and a total width of the outer rings 22c and 22d is narrower than the opening width W1, that is, narrower than the clearance between the protruding portions 9.

According to the ring 22 shown in FIG. 7, a thickness T2 of the ring 22c or 22d is thicker than a thickness T1 of the ring 22a or 22b. In other words, the thickness T1 of the ring 22a or 22b is thinned as much as possible within an allowable range not to degrade the strength and function of the ring 22. In connection with such reduced thickness of the rings 22a and 22b, a height 6b of the column 6, in other words, a height of the recess 7 of the element 1 between the inner circumferential face (i.e., lower face in the direction of y-axis in FIG. 7) of the protruding portion 9 and the bottom portion 7a (or the saddle face 4a) where the outer lateral sides 22e and 22f of the rings 22a and 22b are to be accommodated is also shortened as much as possible.

Thus, according to the example shown in FIG. 7, the thickness T1 of the ring 22a or 22b is thinned as much as possible, and the height 6b of the column 6 for accommodating the ring 22a or 22b is shortened as much as possible. For this reason, a weight and a moment of inertia of the element 1 can be reduced. That is, a load on the belt 22 resulting from the inertia moment of the element 1 when driving the driving belt V is lightened. As a result, durability of the ring 22, i.e., the driving belt V is improved.

Figure 8A:
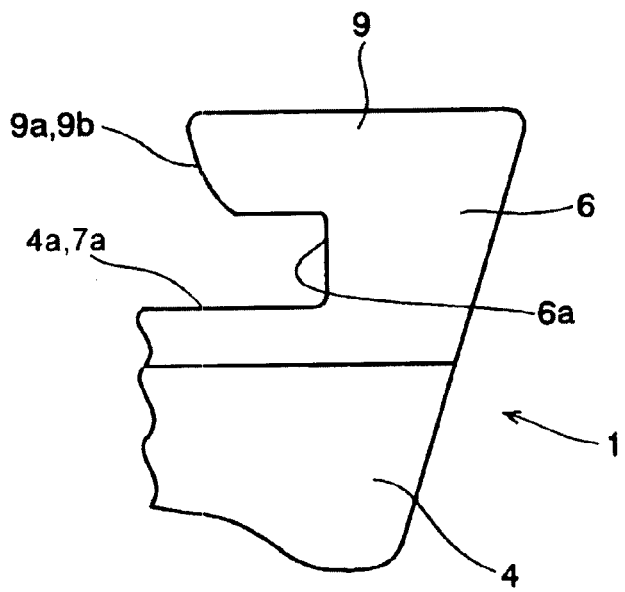
FIG. 8 is a view schematically showing another example of the inclined face as the guide face of the element constituting the driving belt of the invention.
Figure 8B:
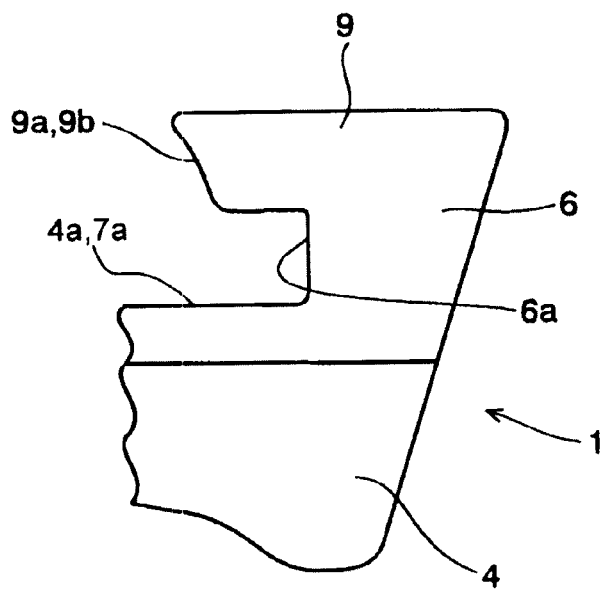

In the first and the second examples, the guide face 9b is a flat face inclined to widen the distance between the end faces 9a of the protruding portions 9 continuously from the outer circumferential side to the inner circumferential side. However, as shown in FIG. 8, the guide face 9b may also be a curved face (i.e., a convex or concave face) inclined to widen the distance between the end faces 9a of the protruding portions 9 continuously from the outer circumferential side to the inner circumferential side. In other words, the guide face 9b may also be a face whose section is arcuate.

Third Example

The third example to be explained hereinafter with reference to FIGS. 9 to 13 is an example of the assembling device of the driving belt V of the invention. The aforementioned first and second examples are examples to improve an easiness of assembly of the driving belt V and to prevent deterioration in durability of the driving belt V, by using the element 1 comprising the guide face 9b formed on the end face 9a of the protruding portion 9, so as to assist the rings 8a and 8b (or rings 21a and 21b or 22a and 22b in the second example) to be fitted into the clearance between the inner circumferential face of the protruding portion 9 and the bottom portion 7a in the recess 7 smoothly. On the other hand, according to the third example, an assembling device M of the driving belt V comprising a guide means is used to improve an easiness of assembly of the driving belt V and to prevent deterioration in durability of the driving belt V Accordingly, further explanation about the elements of the driving belt V already explained in the first and second example with reference to FIGS. 1 to 8 will be omitted by allotting common reference numerals.

Figure 9:
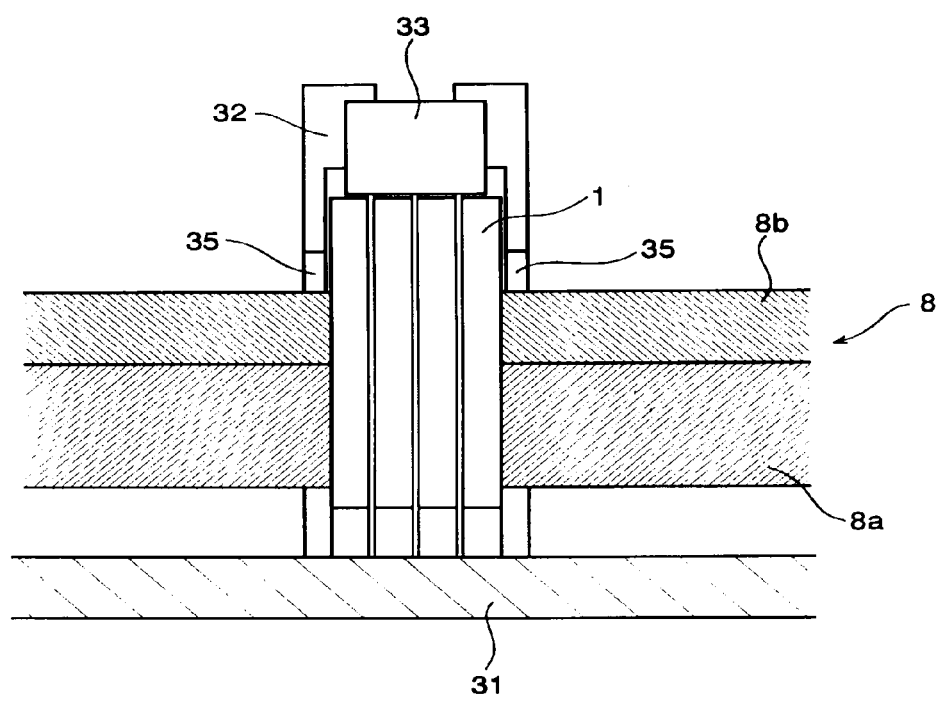
FIG. 9 is a front view schematically showing the assembling device of the driving belt of the invention holding the element.
Figure 10:
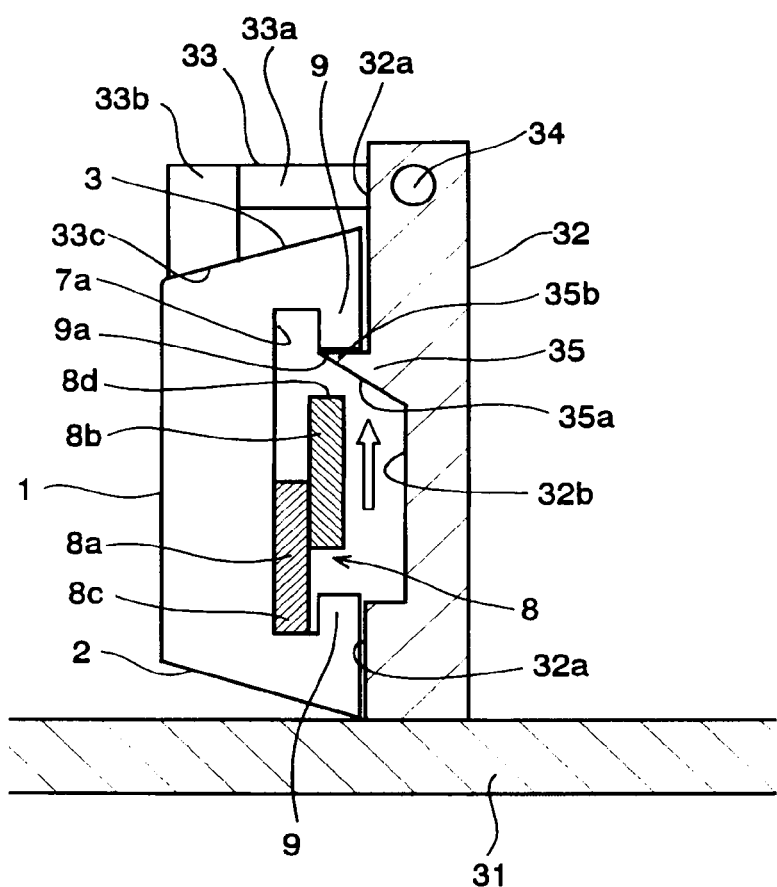
FIG. 10 is a side (or partial sectional) view schematically showing a state where the assembling device of the driving belt of the invention is holding the element.
Figure 11:
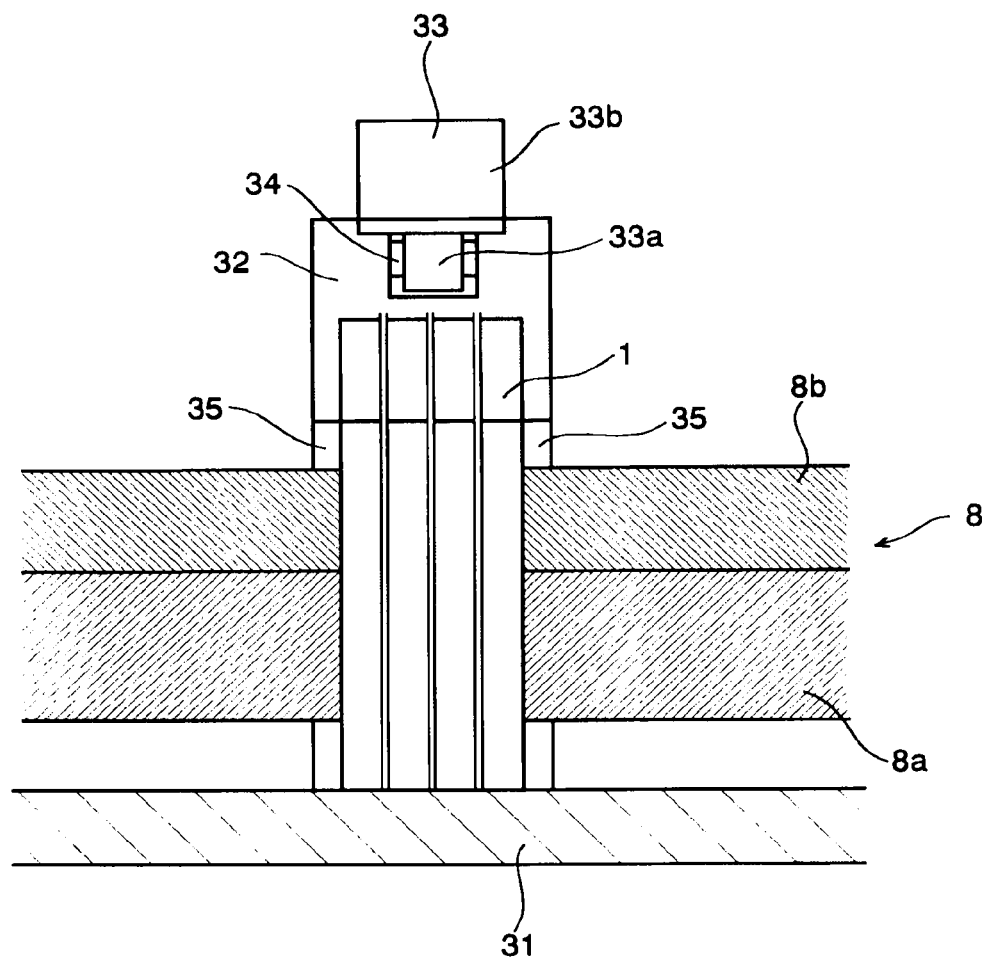
FIG. 11 is a front view schematically showing the assembling device of the driving belt of the invention before holding the element.
Figure 12:
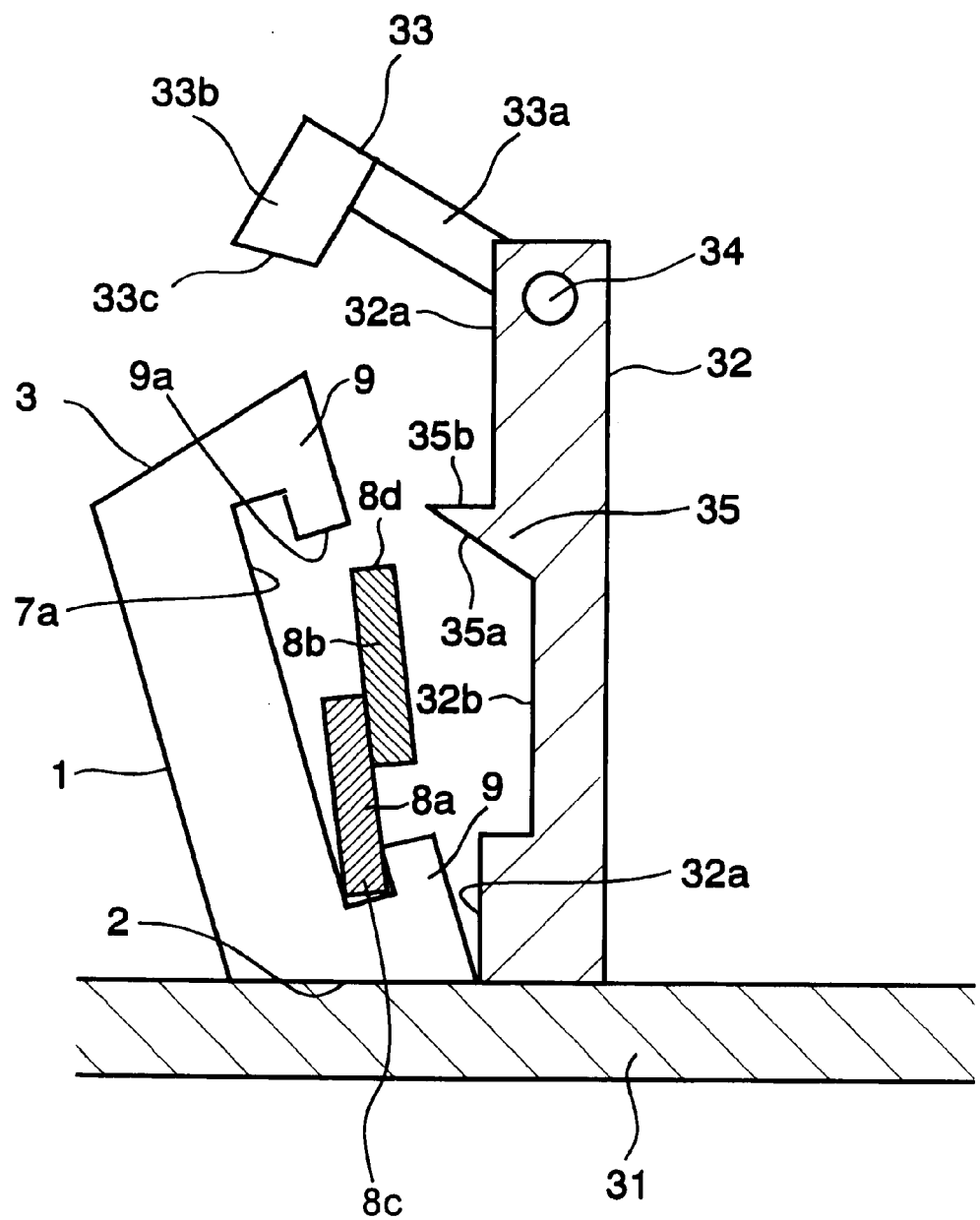
FIG. 12 is a side (or partial sectional) view schematically showing the assembling device of the driving belt of the invention before holding the element.

FIGS. 9 and 11 are front views of the assembling device M of the invention for assembling the driving belt V. More specifically, FIGS. 9 and 11 are front views of the assembling device M from an inner circumferential side of the driving belt V when used to assemble the driving belt V. On the other hand, FIGS. 10 and 12 are side-sectional views of the assembling device M. More specifically, FIGS. 10 and 12 shows a cross-section of the assembling device M vertical to the circumferential length direction of the driving belt V. In addition to above, FIGS. 9 and 10 indicate a state where the assembling device M holds the element 1, and FIGS. 11 and 12 indicate a state before the assembling device M holds the element 1.

As shown in FIGS. 9 to 12, a column member 32 is erected and fixed substantially vertically on a base member 31, and an element holding member 33 is connected to a leading end portion of the column member 32 through a pin 34 in such a manner as to pivot perpendicular to a length direction of the driving belt V.

The column member 32 is a metal column member or a metal plate member comprising an installation surface 32a on one of its faces. In this example, the installation surface 32a is formed on a left face of the column member 32 as shown in FIGS. 10 and 12, and an outer circumferential face of both the protruding portions 9 is contacted to the installation surface 32a when the assembling device M holds the element 1. The column member 32 further comprises a recess 32b near the center of the face on which the installation surface 32a is formed.

The element holding member 33 comprises an arm portion 33a of e.g., a metal column or a metal bar, and a holding portion 33b made of metal. Specifically, one of the end portions of the arm portion 33a (i.e., the right end portion in FIGS. 10 and 12) is pivotally connected to the column member 32 through the pin 34, and the holding portion 33b is formed on the other end portion (i.e., on the left end portion in FIGS. 10 and 12).

The holding portion 33b comprises a holding face 33c to which the lateral face 2 or 3 of the element 1 is contacted when the assembling device M holds the element 1. Here, an inclination of the holding face 33c is identical to that of the lateral face 2 and 3 of the element 1.

In the example shown in FIGS. 9 to 12, a guide portion 35 is formed above the recess 32b for the purpose of guiding the ring 8 into the recess 7 of the element 1. The guide portion 35 may be formed integrally with the column member 32. Alternatively, the guide portion 35 may also be a separated member to be fixed with the column member 32.

A face of the guide portion 35 facing to the base portion 31 side is a contacting face 35a to which the outer lateral side of the ring 8 is contacted when fitted into the recess 7 of the element 1, and an opposite face of the guide portion 35 is a back face 35b to which the end face 9a of one of the protruding portion 9 is contacted or opposed which the assembling device M holds the element 1.

The back face 35b is a flat face vertical to the installation surface 32a. On the other hand, the contacting face 35a is an inclined face extending from a bottom face of the recess 32b of the column member 32 toward a leading end of the back face 35b, in other word, toward an inner edge of the end face 9a of one of the protruding portion 9 in case the element 1 is held by the assembling device M. Therefore, the outer lateral side 8c or 8d of the ring 8a or 8b can be fitted smoothly into the clearance between the inner face of the protruding portion 9 and the bottom portion 7a of the recess 7 of the element 1.

In case of fitting the ring 8 into the recess 7 of the element 1, the rings 8a and 8b are overlapped partially. Specifically, in the example shown in FIGS. 10 and 12, the ring 8a is overlapped on the inner circumferential side, therefore, the outer lateral side 8c of the ring 8a is fitted into the clearance between the inner face of the protruding portion 9 and the bottom portion 7a first of all. Then, the ring 8b, which is overlapped on the outer circumferential side is pushed toward the clearance between the inner face of the protruding portion 9 and the bottom portion 7a of the opposite side. As a result, the outer lateral side 8d of the ring 8d is contacted to the guide face 35a.

In this situation, since the contacting face 35a is inclined as explained above, a component of the pushing force pushing the ring 8b is applied to the outer lateral side 8d of the ring 8b in the inner circumferential direction (i.e., to the left side in FIG. 10). Therefore, the outer lateral side 8d slides on the contacting face 35a in the inner circumferential direction toward the recess 7. Thus, the ring 8b overlapped outwardly is guided by the contacting face 35a when pushed to be fitted into the recess 7. As a result, the outer lateral side 8d of the ring 8b overlapped outwardly can be fitted into the clearance between the inner face of the protruding portion 9 and the bottom portion 7a smoothly.

Thus, the ring 8 can be fitted into the recess 7 of the element 1 smoothly and easiness of assembly of the driving belt V is thereby improved. Moreover, since the ring 8b is not contacted directly with the protruding portion 9 when fitted into the recess 7, the surface of the ring 8b can be prevented from being damaged by the edge of the protruding portion 9. For this reason, deterioration in durability of the driving belt V can be prevented.

Accordingly, the guide portion 35 comprising the contacting face 35a corresponds to the guide means of the invention for applying an inward component of the pushing force pushing the ring 8a or 8c to the outer lateral side 8c or 8d, thereby assisting the ring 8a or 8c to be fitted into the recess 7 of the element 1.

Figure 13A:
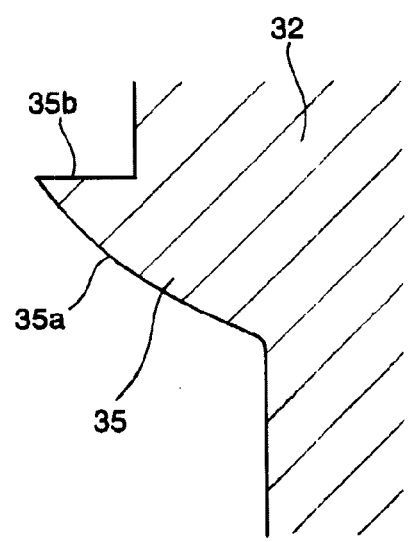
FIG. 13 is a view schematically showing another example of the inclined face formed on the guide portion of the assembling device of the driving belt of the invention.
Figure 13B:
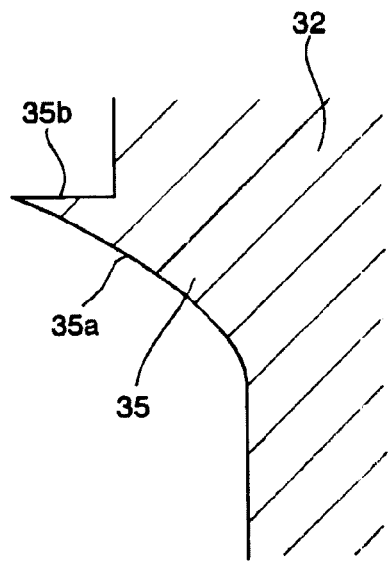

In the third example shown in FIGS. 9 to 12, the contacting face 35a is an inclined flat face extending from the bottom of the recess 32b toward the leading end of the back face 35b. However, the contacting face 35a may also be an inclined curved face (i.e., a convex or concave face) extending from the bottom of the recess 32b toward the leading end of the back face 35b, as shown in FIG. 13. In other words, the contacting face 35a may also be an inclined face whose section is arcuate.

First Example of Assembly

Here will be explained a procedural example of an assembling work of the driving belt V with reference to FIGS. 1 to 5, and 9 to 12. First of all, here will be explained an assembling example of the driving belt V using the element 1 comprising the guide face 9b on the end face 9a of both of the protruding portions 9 for assisting the ring 8 to be fitted into the clearance between the inner face of the protruding portion 9 and the bottom portion 7a.

At first, predetermined portions in the length direction of the rings 8a and 8b aligned parallel to each other are overlapped. As shown in FIG. 4, when the rings 8a and 8b are overlapped partially, a remaining portion of the rings 8a and 8b are kept parallel to each other. Alternatively, the rings 8a and 8b may also be overlapped partially in its entire length.

The width L2 of the ring 8 thus narrowed by overlapping the rings 8a and 8b partially is narrower than the opening width W1 of the element 1. Therefore, the ring 8 can be fitted into the recess 7 of the element 1 from the overlapped portion. Alternatively, the ring 8 can also be fitted into a plurality of the recesses 7 at the same time by arranging predetermined pieces of the elements 1 in advance. Then, the outer lateral side 8c of the ring 8a partially overlapped inside of the ring 8b is fitted into one of the clearances between the inner circumferential face of the protruding portion 9 and the bottom portion 7a of the recess 7 (i.e., in the left side of FIG. 3).

In case of overlapping the rings 8a and 8b partially and remaining portion of those rings 8a and 8b are aligned parallel to each other, the element(s) 1 accommodating the overlapped portion of the rings 8a and 8b in its recess(es) 7 is/are then moved in the length direction of the ring 8 to the portion where the rings 8a and 8b are aligned parallel to each other. As described above, the width L1 of the rings 8a and 8b aligned parallel to each other is narrower than the width W2 of the element 1 but wider than the opening width W1 of the element 1. That is, the outer lateral side 8d of the ring 8b partially overlapped outside of the ring 8a is also fitted into the space between the inner circumferential face of the protruding portion 9 and the bottom portion 7a of other side (i.e., in the right side of FIG. 3), by moving the element(s) 1 accommodating the overlapped portion of the rings 8a and 8b in the recess(es) 7 to the portion where the rings 8a and 8b are aligned parallel to each other. As a result, the rings 8a and 8b are held firmly in the recess 7 by the protruding portions 9, and the rings 8a and 8b are accommodated properly in the recess 7 of the element 1.

The above-explained routine of fitting the ring 8 into the recess(es) 7, and moving the element(s) 1 to the portion where the rings 8a and 8b are aligned parallel to each other is repeated sequentially.

As described above, the rings 8a and 8b can be moved freely at an initial phase of the above-mentioned routine of fitting the ring 8 into the recess 7 of the element 1 so that the rings 8a and 8b can be overlapped comparatively easily. However, the movements of the rings 8a and 8b are to be restricted eventually with the increase of the number of the first element 1a being interlinked through the male and female connections 11 and 12 and holding the rings 8a and 8b. That is, the rings 8a and 8b become difficult to be overlapped eventually. According to the invention, however, the rings 8a and 8b still can be twisted even at this stage by a pivotal movement of the element 1 being interlinked with one another and accommodating the ring 8 in the recess 7, which is achieved by applying an external force to the element 1 by a predetermined method.

When the ring 8 is fitted into the recess 7 of all of scheduled pieces of the elements 1, the external force to pivot the element 1 is released so that the pivoted element 1 is balanced again and the overlapped rings 8a and 8b are thereby returned to be parallel to each other. As a result, the rings 8a and 8b constituting the ring 8 are entirely aligned parallel to each other in the recesses 7 of the interlinked elements 1.

Figure 14:
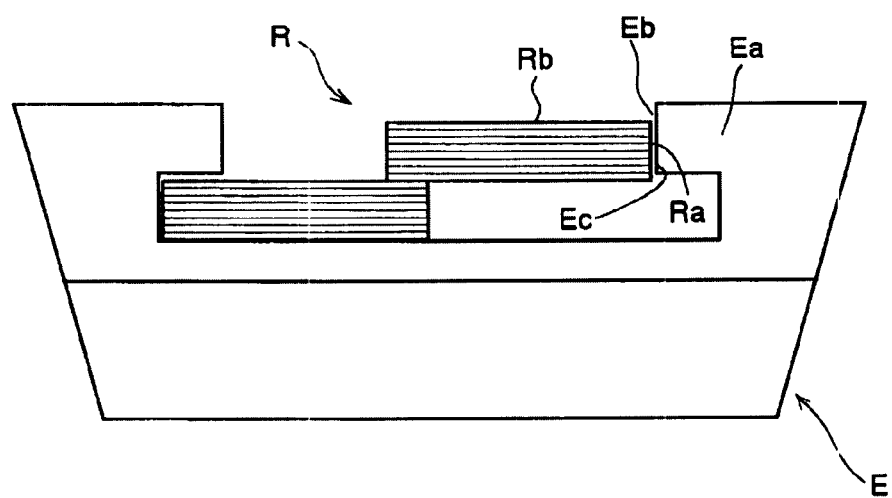
FIG. 14 is a view schematically showing an element of conventional driving belt.

When the overlapped rings 8a and 8b are aligned parallel to each other again in the recess 7, the ring 8b overlapped on the outer circumferential side is fitted into the clearance between the inner circumferential face of the protruding portion 9 and the bottom portion 7a. That is, assembly of the driving belt V is completed. However, according to the conventional element E shown in FIG. 14, an end face Eb of the latch portion Ea and an outer lateral side Ra of the ring R interfere with each other; and this makes difficult to fit the ring R into the recess of the element E.

In order to solve the above-mentioned problem, the element 1 used in the assembling method of the driving belt V of the invention comprises the guide face 9b formed on the end face 9a of both of the protruding portions 9, so as to assist the ring 8 to be fitted into the clearance between the inner circumferential face of the protruding portion 9 and the bottom portion 7a of the recess 7. Therefore, according to the invention, the ring 8 can be fitted easily into the recess 7. Moreover, the surface of the ring 8 can be prevented from being damaged by the edge of the protruding portion 9 of the element 1.

Specifically, when returning the overlapped rings 8a and 8b to be aligned parallel to each other, a pushing force F is applied to the ring 8b overlapped outside of the ring 8a to push the ring 8b toward the lateral side of the element 1 (in the width direction of the element 1), thereby pushing the outer lateral side 8d of the ring 8b onto the end face 9a, i.e., onto the guide face 9b of the protruding portion 9.

As explained above, since the guide face 9b is inclined to continuously widen the distance between the end faces 9a from the outer circumferential side to the inner circumferential side, a component Fc of the pushing force F is applied to the outer lateral side 8d of the ring 8b in the inner circumferential direction (i.e., downwardly of the y-axis in FIG. 5) when the pushing force F is applied to the ring 8b thereby pushing the outer lateral side 8d onto the guide face 9b. Consequently, the outer lateral side 8d slides on the guide face 9b from the outer circumferential side to the inner circumferential side when fitted into the recess 7 of the element 1. Thus, the ring 8b overlapped on the outside of the ring 8a is guided by the guide face 9b so that the ring 8b can be fitted smoothly into the clearance between the inner circumferential face of the protruding portion 9 and the bottom portion 7a. As a result, the rings 8a and 8b return parallel to each other and the fitting work of the ring 8 into the recess 7 of the element 1 is completed.

According to the first example of assembly of the driving belt V, therefore, the ring 8 can be fitted smoothly into the recess 7 of the element 1 and easiness of assembly of the driving belt V is thereby improved. Moreover, since the ring 8b is not contacted directly with the protruding portion 9 when fitted into the recess 7, the surface of the ring 8b can be prevented from being damaged by the edge of the protruding portion 9. For this reason, deterioration in durability of the driving belt V can be prevented.

Second Example of Assembly

Next, here will be explained the second example of assembly of the driving belt V using the assembling device of the driving belt V comprising the guide means for assisting the ring 8 to be fitted into the recess 7 of the element 1 which has been explained in the third example.

First of all, predetermined portions in the length direction of the rings 8a and 8b aligned parallel to each other are overlapped. As shown in FIG. 4, when the rings 8a and 8b are overlapped partially, a remaining portion of the rings 8a and 8b are kept parallel to each other. Alternatively, the rings 8a and 8b may also be overlapped partially in its entire length.

On the other hand, the element 1 is installed on the base portion 31 in such a manner as to contact one of the lateral faces 2 and 3 thereof to the base portion 31. In the example shown in FIG. 12, the lateral face 2 is contacted to the base face 31a. Then, the overlapped portion of the rings 8a and 8b are fitted into the recess 7 of the element 1, and the outer lateral side 8c of the ring 8a overlapped inside of the ring 8b is fitted into one of the clearances between the inner circumferential face of the protruding portion 9 and the bottom portion 7a (of the lower side of FIGS. 10 and 12).

The element 1 thus holding the outer lateral side 8c of the ring 8a in the clearance between the protruding portion 9 and the bottom portion 7a is held by the assembling device M. Specifically, outer circumferential faces of both of the protruding portions 9 are contacted with the installation surface 32a of the column member 32, and the element 1 is held by the holding member 33b while pressing the holding face 33c onto another lateral face 3 of the element 1.

After thus holding the element 1 by the assembling device M, a pushing force F is applied to the ring 8b overlapped outside of the ring 8a in the width direction of the element 1 (i.e., in the vertical direction in FIGS. 10 and 12) to push the outer lateral side 8d of the ring 8b onto the contacting face 35a.

As explained above, since the contacting face 35a is an inclined face extending from a bottom face of the recess 32b of the column member 32 toward a leading end of the back face 35b, an inward component of the pushing force F (i.e., toward the left side in FIGS. 10 and 12) is applied to the outer lateral side 8d of the ring 8b when the ring 8b is pushed by the pushing force F.

As a result, the outer lateral side 8d slides on the contacting face 35a in the inner circumferential direction toward the recess 7, that is, the outer lateral side 8d of the ring 8b overlapped outwardly is guided by the contacting face 35a to be fitted into the clearance between the inner face of the protruding portion 9 and the bottom portion 7a smoothly. Consequently, the rings 8a and 8b are returned parallel to each other in the recess 7 of the element 1.

The above-explained routine of fitting the ring 8 into the recess 7 of the element 1 is repeated sequentially, and assembly of the driving belt V is to be completed when the ring 8 is fitted into the recess 7 of all of the desired number of the elements 1.

According to the second example of assembly of the driving belt V therefore, the ring 8 can be fitted smoothly into the recess 7 of the element 1 and easiness of assembly of the driving belt V is thereby improved. Moreover, since the ring 8b is not contacted directly with the protruding portion 9 when fitted into the recess 7, the surface of the ring 8b can be prevented from being damaged by the edge of the protruding portion 9. For this reason, deterioration in durability of the driving belt V can be prevented.

Here, the present invention should not be limited to the aforementioned example. That is, although the examples of the present invention thus far describe relate to the driving belt used in a belt type continuously variable transmission, the present invention can also be applied to a driving belt to be applied to another kind of transmission mechanism composed mainly of a belt and pulleys.

The invention claimed is:

1. A driving belt, comprising:
   a plurality of elements interlinked annularly to situate a recess on an outer circumferential side, the recess including an upper face;
   two rows of endless rings parallel to each other in the recess of the elements, the rings including an inner circumferential face configured to fit onto the upper face of the recess;
   protruding portions that hold the rings to prevent detachment of the rings from the recess, which protrude from an outer circumferential side of inner walls of the recess toward a width center of each element so a maximum clearance between end faces of the protruding portions is narrower than a total width of the rings; and
   a guide face is a flat inclined face on at least one of the end faces of the protruding portions that produces an inward component of a pushing force that pushes one of the rings into the recess,
   wherein a distance between the inclined face of and an end face an opposite protruding portion becomes wider continuously toward an inner circumferential side.

2. The driving belt as claimed in claim 1, wherein:
   each element comprises a male connection protruding toward an adjoining element on a face of the element opposite to the adjoining element, and a female connection into which the male connection is fitted loosely on a face opposite to the face including the male connection; and
   each of the elements is interlinked pivotally through the male and female connections.

3. The driving belt as claimed in claim 2, wherein:
   the male connection and the female connection are respectively at one spot of the face where the male connection and the female connection are respectively included.

4. The driving belt as claimed in claim 3, wherein:
   the male and female connections are respectively on a width center of the face where the male and female connections are respectively included.

5. The driving belt as claimed in claim 1, wherein:
   the ring comprises an outer layer, which is laid on an outer face thereof in the recess, and which is disposed between the protruding portions.

6. The driving belt as claimed in claim 1, wherein the pushing force is in a direction toward the guide face, and the inward component of the pushing force is perpendicular to the pushing force.

7. An assembling method of a driving belt, in which a plurality of elements is interlinked annularly to situate a recess on an outer circumferential side, and in which two rows of endless rings are accommodated parallel to each other in the recess of the element and held by protruding portions formed on an opening end side of inner walls of the recess to prevent detachment of the rings, comprising:
   overlapping the two rows of rings;
   fitting an outer lateral side of an inwardly overlapped ring into an inner circumferential side of one of the protruding portions in the recess, to fit the inwardly overlapped ring onto an upper face of the recess;
   thereafter fitting an outwardly overlapped ring into the inner circumferential side of other protruding portion in the recess, by pushing the outwardly overlapped ring toward an other protruding portion while applying an inward component of a pushing force to an outer lateral side of the pushed ring; and
   applying an inward component of the pushing force pushing the outwardly overlapped ring to the outer lateral side of the pushed ring, by using the element comprising a guide face that is a flat inclined face on an end face of at least one of the protruding portions so that a clearance between the guide face and an end face of the other protruding portion becomes wider from an outer circumferential side to an inner circumferential side.

8. The assembling method of a driving belt as claimed in claim 7, wherein:
   the flat inclined face is a face to which the outer lateral side of the pushed ring is slidably contacted.

9. The assembling method of a driving belt as claimed in claim 7, wherein the pushing force is in a direction toward the guide face, and the inward component of the pushing force is perpendicular to the pushing force.

10. A driving belt, comprising:
- a plurality of elements interlinked annularly to situate a recess on an outer circumferential side, the recess including an upper face;
- two rows of endless rings parallel to each other in the recess of the elements, the rings including an inner circumferential face configured to fit onto the upper face of the recess;
- protruding portions that hold the rings to prevent detachment of the rings from the recess, which protrude from an outer circumferential side of inner walls of the recess toward a width center of each element so a maximum clearance between end faces of the protruding portions is narrower than a total width of the rings; and
- a guide face is a concave face on at least one of the end faces of the protruding portions that produces an inward component of a pushing force that pushes one of the rings into the recess, wherein a distance between the concave face of and an end face an opposite protruding portion becomes wider continuously toward an inner circumferential side.

* * * * *